United States Patent [19]

Matz et al.

[11] 3,817,436

[45] June 18, 1974

[54] DICTATING AND TRANSCRIBING SYSTEM

[75] Inventors: Bjorn J. Matz, Forest Hills, N.Y.; Theodore P. Nenninger, East Brunswick, N.J.; James C. Whitney, Fairfield; Anthony Ciaraldi, Stanford, both of Conn.; Leslie N. Wilder, New Rochelle, N.Y.

[73] Assignee: Dictaphone Corporation, Rye, N.Y.

[22] Filed: Dec. 26, 1972

[21] Appl. No.: 317,928

[52] U.S. Cl. .................... 226/25, 226/49, 226/118, 226/43

[51] Int. Cl. .................... B65h 25/00

[58] Field of Search .......... 226/118, 119, 25, 49, 43; 179/100.2 Z

[56] References Cited

UNITED STATES PATENTS

| | | | |
|---|---|---|---|
| 2,988,604 | 6/1961 | Nye | 179/100.2 Z |
| 2,989,594 | 6/1961 | McKaig | 179/100.2 Z |
| 3,041,417 | 6/1962 | Stroud et al. | 179/100.2 Z |
| 3,415,434 | 12/1968 | Bolick, Jr. | 226/25 |
| 3,552,618 | 1/1971 | Molnar | 179/100.2 Z |
| 3,596,818 | 8/1971 | Curtis | 226/25 |
| 3,698,723 | 10/1972 | Kobler | 226/118 |

FOREIGN PATENTS OR APPLICATIONS

| | | | |
|---|---|---|---|
| 685,032 | 12/1952 | Great Britain | 179/100.2 Z |

*Primary Examiner*—Allen N. Knowles
*Attorney, Agent, or Firm*—Curtis, Mossis & Safford; Arthur V. Smith, Esq.

[57] ABSTRACT

A dictating and transcribing system is provided with means for recording and transcribing and including a single-bin, random-wind tape storage magazine to store an endless loop of magnetic tape in random folds. The tape is drawn from the magazine at one side, passed over the top of the apparatus, back into the magazine and out of the magazine through a dictate-playback station. After passing through the dictate-playback station the tape is returned to the magazine where it may be stored in random-wound folds until a transcribe station is activated to draw the tape from the magazine through the transcribe station and back into the magazine where it is stored awaiting further dictation. Both the dictate-playback station and the transcribe station are provided with bidirectional tape drive capability and tape tautness sensors are provided to control dictate and transcribe functions according to the sensed tape tautness.

8 Claims, 6 Drawing Figures

DICTATING AND TRANSCRIBING SYSTEM

This invention relates to a system for recording and transcribing dictated messages and/or other intelligence, and more particularly to recording and transcribing systems which utilize an endless loop of magnetic tape which is stored in random fashion in a single-bin tape storage magazine thus making it possible for dictation and/or transcription to be accomplished from remote locations either simultaneously or separately.

Recording and transcribing systems utilizing an endless loop of magnetic tape so that both dictation and transcription can be accomplished at the same time have been proposed heretofore. Examples of such prior art recording and transcribing systems are those shown in U.S. Pat. No. 2,988,604 to Nye and U.S. Pat. No. 2,989,594 to McKaig. Each of those units use a double-bin tape storage, the first storage bin to store tape after messages have been recorded thereon and the second storage bin to store tape after the transcriber has listened to the recorded messages. Both of these storage bins must be large enough to accommodate all of the tape as, for example, when the dictator has recorded on the whole length of tape before any of it has been trascribed or when all of the tape has been passed through the transcriber unit without any recording taking place. Hence, with such an arrangement, it is necessary to have two storage bins each large enough to accommodate the complete length of tape to be used. U.S. Pat. No. 3,596,818 to Curtis et al. discloses an endless loop single-bin recording and transcribing systems which system obviates many of the problems associated with a double-bin system Each of the above referred to prior art systems utilize some type of tape tautness sensing mechanism to disconnect a particular tape drive when a tautness in the tape is detected which would strain the tape to a breaking point. The present invention provides an improved tape drive system to provide a transcribe tape drive override during conditions of sensed tape tautness to permit continued use of the apparatus under the control of the transcribe tape drive unit so that any material recorded on the tape can be transcribed by the transcriptionist even when the dictator has concluded dictation.

It is therefore an object of the present invention to provide an improved endless loop magnetic tape dictating and transcribing system wherein the endless loop of tape is random-wound in a single storage bin.

It is a further object of the present invention to provide an improved random-wind, single-bin dictating and transcribing system wherein the tape feed and tape drive system are improved to lessen tape tension and to provide a transcribe station drive override so that the equipment is maintained in an operational state.

A still further object of the present invention is to provide a new and improved recording and transcribing system which can be operated with a single-bin tape storage arrangement for dictating and transcribing messages either separately or simultaneously, and wherein provision is made to prevent undesired tape tautness which may cause tape breakage while maintaining the equipment in an operative state.

These and others objects and advantages of the present invention will be more readily apparent after consideration of the following specification taken in conjunction with the accompanying drawing, wherein.

Figure 1:
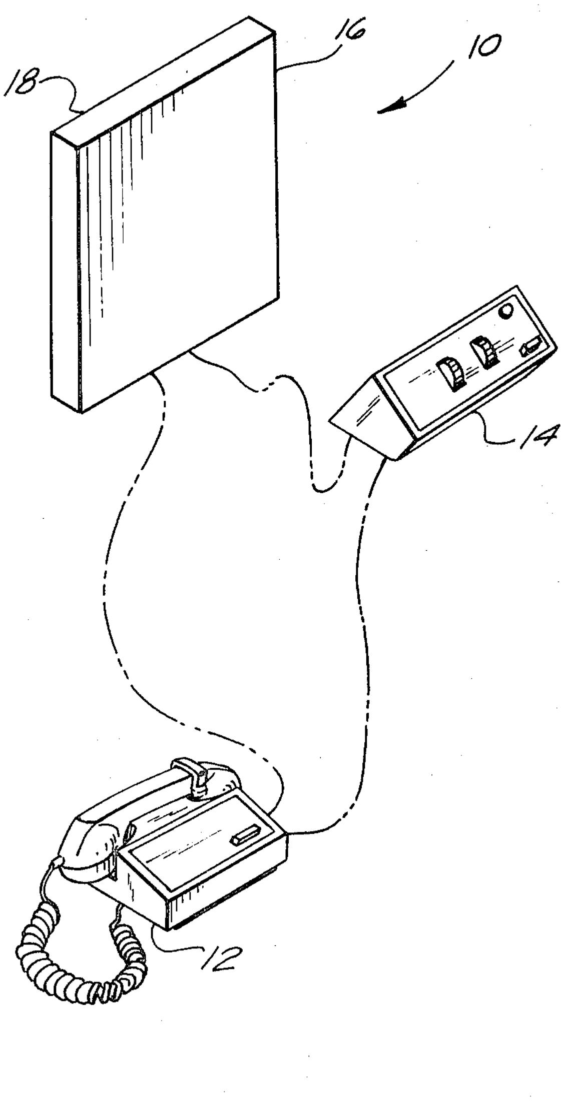
FIG. 1 is a diagrammatic representational view showing a complete dictating and transcribing system.

With reference to the drawing and particularly FIG. 1, a dictating and transcribing system 10 is shown diagrammatically which includes a dictating station 12 and a transcribing station 14 connected to a dictation, transcribe and tape storage apparatus 16.

Figure 4:
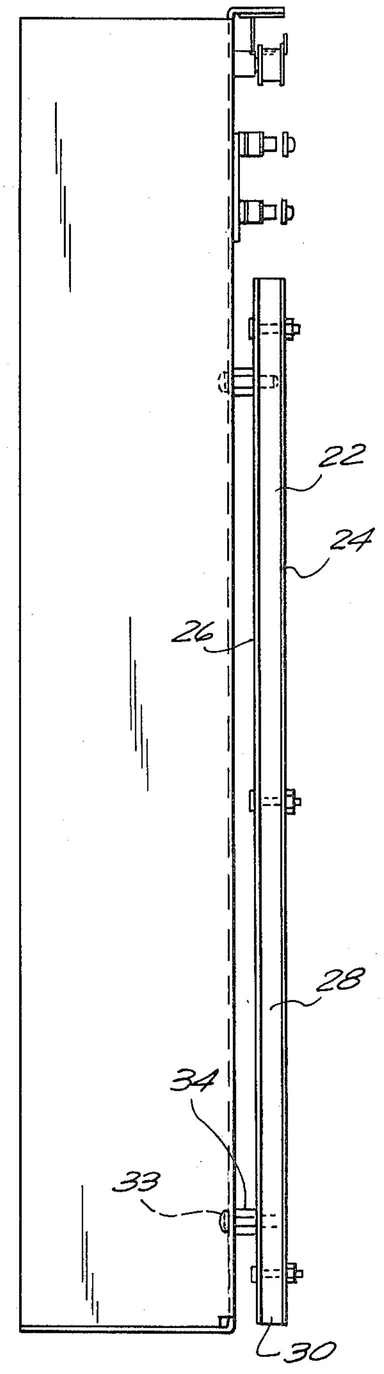
FIG. 4 is a side elevational view of the tape drive and tape storage system.
Figure 2:
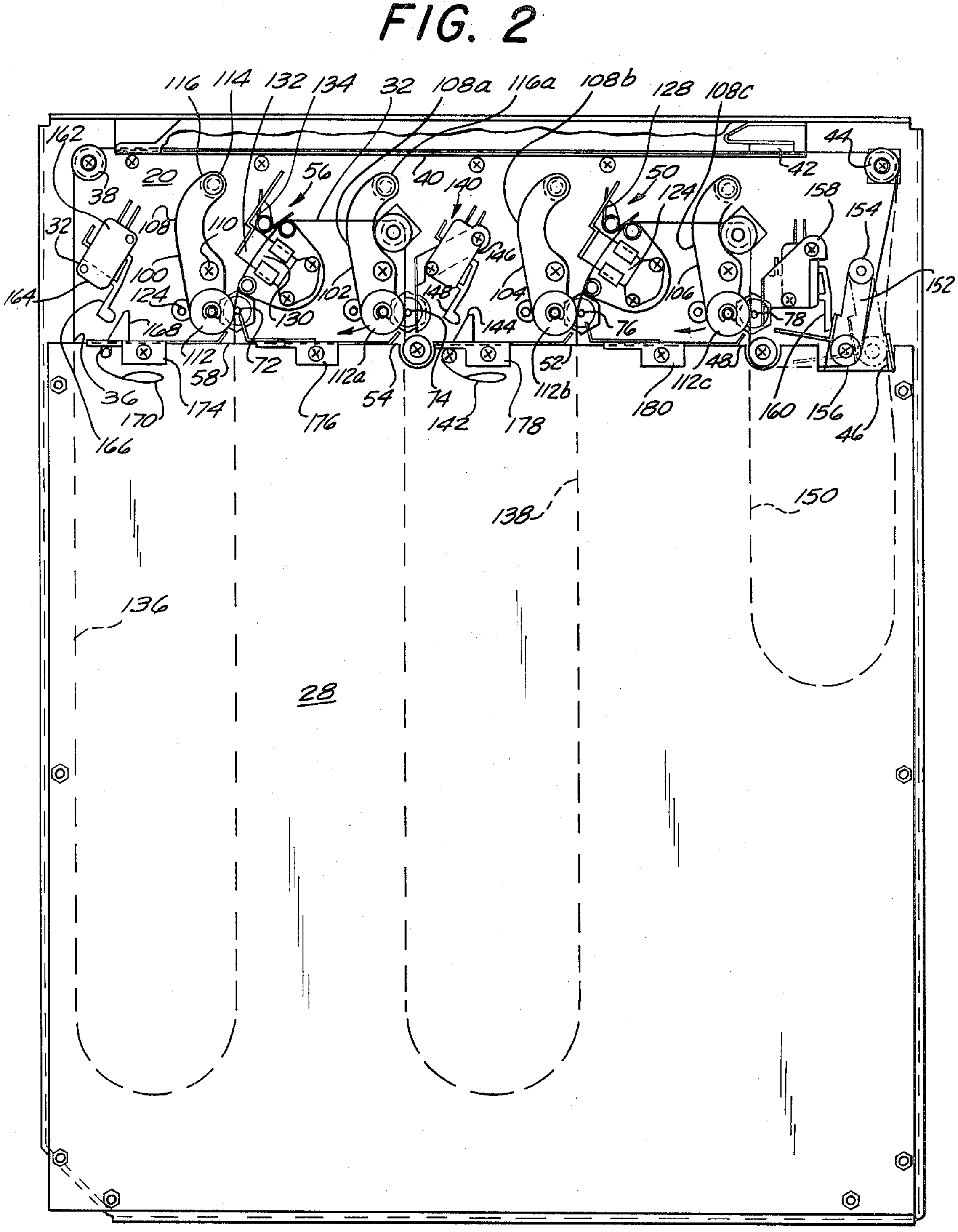
FIG. 2 is an elevational view showing the front of the tape storage and tape drive system of the present invention.
Figure 3:
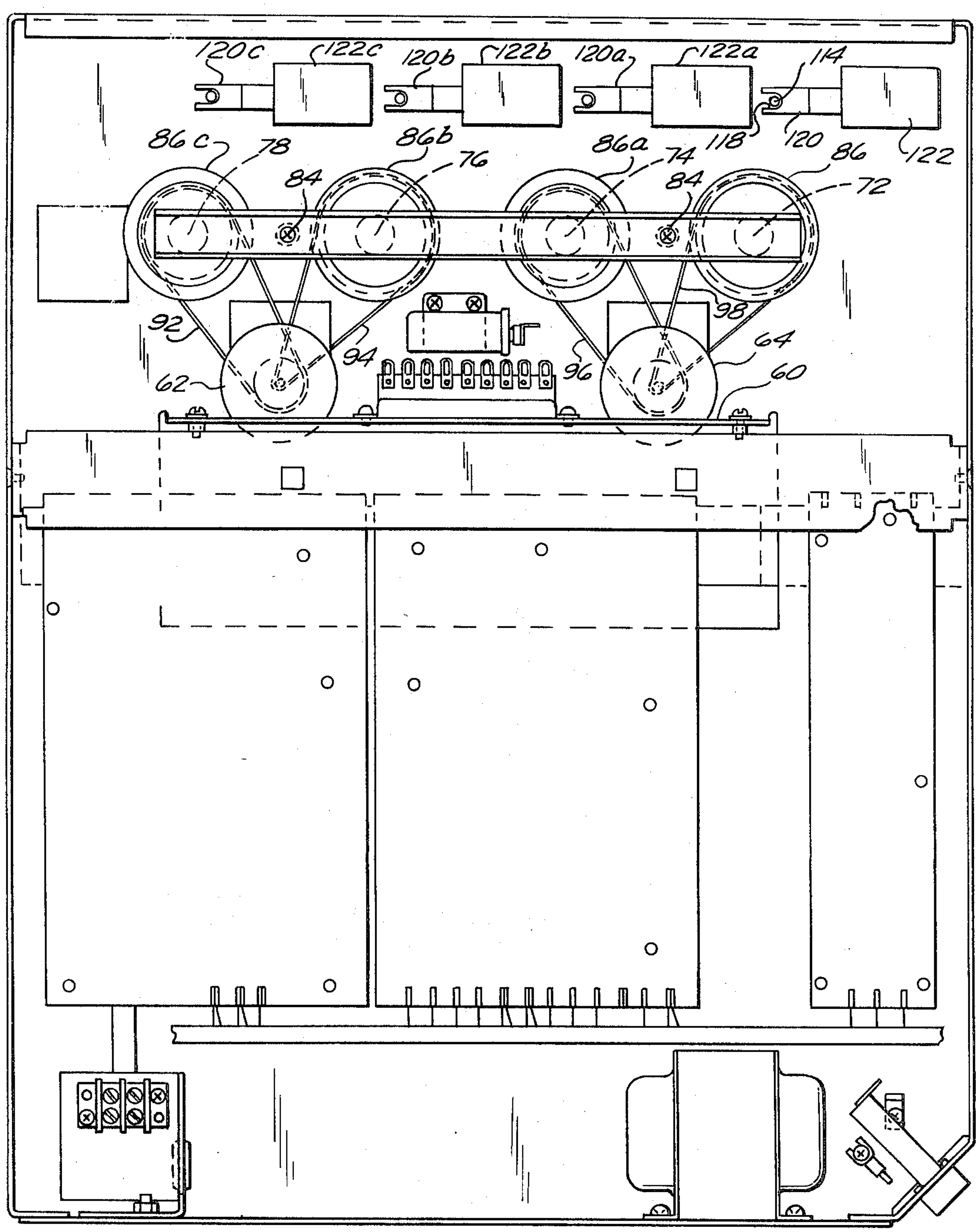
FIG. 3 is an elevational view showing the rear of the tape storage and tape drive system of the present invention.

With reference now to FIGS. 2 and 3 as well, the dictate-transcribe system 16 includes a housing 18, which is removable for service of the equipment, and a chassis plate 20 within the housing to which the various components of the system are mounted. The components of the system include a tape storage magazine 22 (see FIG. 4 as well) comprising frong and rear plate members 24 and 26, respectively, spaced from each other by peripheral spacer bars 30 to define a tape storage cavity 28 therebetween. The panels 24 and 26 are spaced from each other a distance which is slightly greater than the width of the magnetic tape utilized in the apparatus. The tape 32 is preferably a magnetic tape suitable for recording which is in the form of an endless loop of a sufficient length to provide, for example, one hour of continuous dictation and the tape accumulates in random loops within the tape storage magazine. Because the spacing between panels 24 and 26 is slightly wider than the width of the tape, no tangling or snarling of the tape occurs.

The tape magazine 22 is mounted to the chassis plate 20, for example, by suitable bolts 33 and spacer nuts 34, and the tape 32 is fed out of the magazine through a tape opening 36 in the upper left portion of the magazine 22, as viewed in FIG. 2, over a rotatably mounted roller member 38 extending from the chassis plate 20, along a horizontally disposed guide track 40, which is provided with a spring urged pressure pad assembly 42 at one end, over another rotatably mounted roller member 44 and back into the magazine 22 through a tape receiving opening 46 in the upper right corner of the magazine. The tape is drawn out of the magazine 22 through a tape opening 48, threaded through a dictate-playback station 50 to return to the magazine through a tape opening 52 and out of the magazine through a tape opening 54 to be threaded through a transcribe station 56 and returned to the magazine through a tape opening 58. With this construction provision is made to store the tape 32 in three discreet loops within the magazine 22, as will be explained more fully hereinbelow.

Dictating and transcribing equipment must have certain inherent capabilities in order to be acceptable for the intended use of providing a means for a dictator to record a transcription, permit backspacing and playback so the dictator can review the transcription and also permit a transcriptionist to listen to the dictated material and allow the transcriptionist to play back the material if necessary. Hence, the equipment must have bidirectional drive capabilities at both the dictating station and the transcription station. Accordingly, the apparatus of the present invention is provided with bidirectional drive capability at both the dictating station 50 and the transcribing station 56. The drive of the tape through the apparatus is accomplished through a rotating capstan against which a pinch roller or pressure roller presses the tape.

As best seen in FIG. 3, the chassis plate 20 includes an extending plate 60 upon which is mounted a pair of identical motors 62 and 64, respectively. The output shaft 66 of each motor (see FIG. 6) includes a grooved hub 68 secured thereon and a grooved end segment 70 to receive a drive belt to drive the tape drive capstans. Four driven capstans 72, 74, 76 and 78, respectively, are provided which are driven by the motors 62 and 64. The capstan assemblies are identical for each capstan and hence a description of one of the capstan assemblies will suffice. Each of the capstan assemblies include a cylindrical capstan system 72–78 which extends through the chassis plate 20 and is suitably rotatably journaled within the chassis plate by a bushing 80 and within a support bar 82 spaced from, and fixed to, the chassis plate 20 by suitable bolt members 84.

Figures 5, 6:
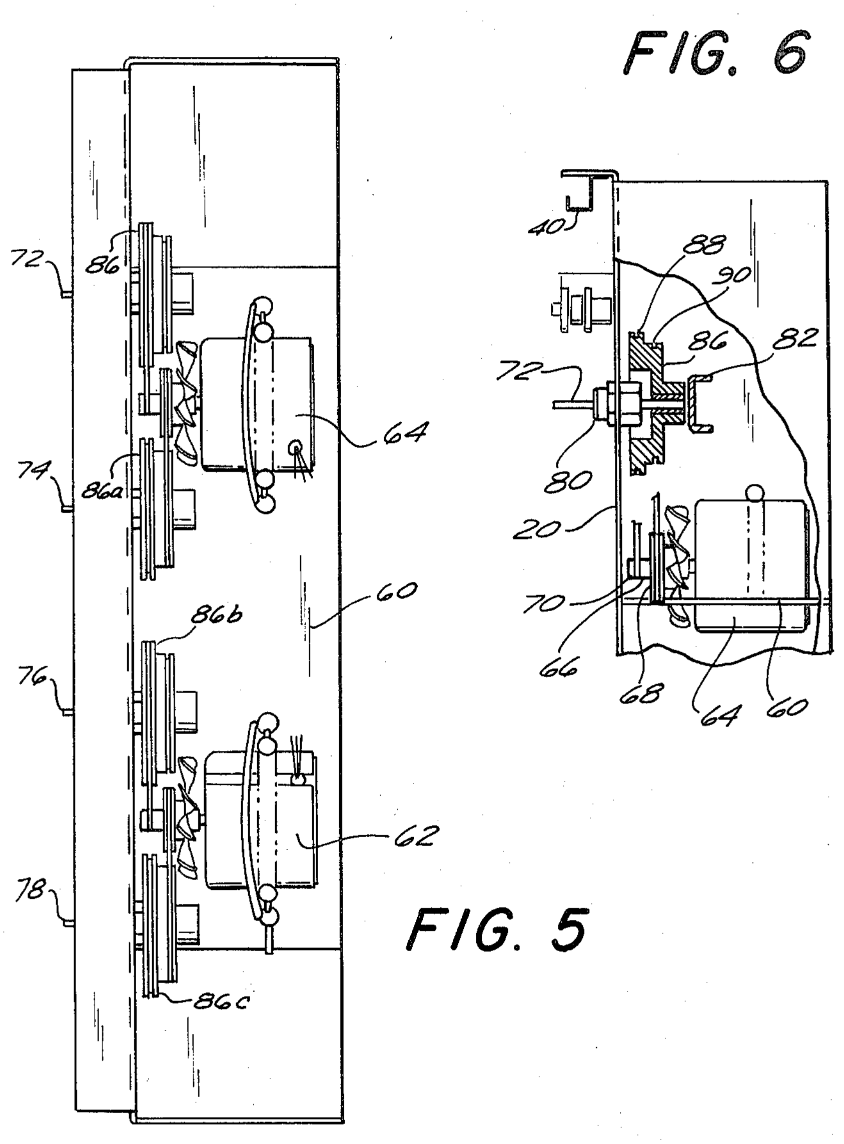
FIG. 5 is a top plan view of the tape drive and tape storage system.
FIG. 6 is an enlarged side elevational view showing the motor and capstan assembly of a typical tape drive unit.

Secured to each capstan shaft 72–78 is an identical hub member 86. In FIG. 6, the hub 86 is shown to be associated with capstan shaft 72 and to differentiate from the other identical hub members the designators **86*a* is used for the hub associated with shaft 74, 86*b* for the hub associated with shaft 76, and 86*c* for the hub associated with shaft 78. Each hub 86 includes a grooved disc segment 88 adjacent the chassis plate 20 and a grooved disc segment 90 of a lesser diameter more removed from chassis plate 20.**

A drive belt 92 is engaged about grooved hub 68 of motor 62 and about grooved hub **90*c* of hub 86*c* to drive capstan 78 while another drive belt 94 is engaged about the grooved segment 70 of the output shaft of motor 62 and about the grooved hub 88b to drive capstan 76. In like manner, a drive belt 96 is engaged about grooved hub 68 of motor 60 and the grooved hub 90*a* to drive capstan 74 and a drive belt 98 is engaged about the grooved segment 70 of the drive shaft of motor 60 and the grooved hub 88 to drive capstan 72. Thus, because of the various drive ratios between the output shaft of the motors 62 and 64 and the hubs 88 and 90, capstans 72 and 76 are driven at a lower rate of speed than capstans 74 and 78. Capstans 72 and 76 are associated with the tape drive system to drive the tape in a forward direction at a slower recording and transcribing speed while capstans 74 and 78** are associated with the tape drive system to drive the tape in a reverse or backspace mode and, consequently, drive the tape at a higher rate of speed.

The unit of the present invention is designed so that when any operating mode is initiated both of the motors 62 and 64 are actuated so that each of the drive capstans 72–78 rotate at all times when the unit is in any operating mode. The particular tape drive for recording, backspace and playback for dictating station 50 and transcription and backspace for transcribe station 56 are selected by engaging one or more of a plurality of pinch rollers against one of the driven capstans.

As best seen in FIG. 2, each of the drive capstans 72–78 has associated therewith a pinch roller assembly 100, 102, 104 and 106, respectively. Each of the pinch roller assemblies 100–106 are identical so that the description of one pinch roller assembly 100 will be made and like elements in the other pinch roller assemblies will be designated with the same numeral followed by *a, b* or *c*, respectively. Pinch roller assembly 100 includes a lever member 108 pivotally secured to the chassis plate 20, as at 110, and is provided with a pinch roller 112 rotatably secured to lever 108 at its lower end. The upper end of lever 108 includes a pin 114 which extends through an oversized aperture 116 in chassis plate 20 where it is engaged within a slot 118 (see FIG. 3) of a plunger rod 120 of a solenoid 122.

In an unactivated state solenoid 122 has its plunger rod 120 extended and when it is actuated, by an electrical input from an associated electrical control circuit (not shown), plunger rod 120 retracts drawing pin 114 with it. Thus, retraction of the plunger rod 120 causes lever 108 to pivot about its pivotable mounting 110 and draws the pinch roller 112 toward the associated capstan 72. Tape 32 is disposed between capstan 72 and the pinch roller 112 so that when the pinch roller is brought into abutting relationship with the capstan, the capstan 72 drives the tape. A pin 124 is also provided extending from chassis plate 20 to limit the pivoting motion of the pinch roller 112 and lever 108 when the plunger 120 is extended after the solenoid 122 is deactivated.

During operation of the apparatus in the dictate or dictator listen mode, solenoid **122*b* is actuated by an appropriate electrical response from the control electrical circuitry (not shown) so that plunger 120*b* is withdrawn pivoting lever 108*b* so that pinch roller 112*b* contacts the tape 32 and presses it against drive capstan 76 and the tape driven by drive capstan 76 is now pulled through dictate station 50. The dictate station 50 includes a transducer head 124 provided with recording and playback transducer elements which is mounted to the chassis plate 20. A pressure pad 126 is also mounted to chassis plate 20 and is urged by a coil spring member 128 against transducer element 124 to firmly position the tape 32** on the face of the transducer head.

In like manner, transcribe station 56 includes a transducer head 130 provided with a playback transducer element thereon to pick up magnetic signals on the tape 32. A pressure pad 132 urged by coil spring 134 maintains the tape 32 in firm contact on the face of transducer head 130. When a transcriptionist activates the transcribe station 56 solenoid 122 is actuated to withdraw plunger 120 and pivot lever 108 to bring pinch roller 112 in contact with drive capstan 72 thereby pinching the tape 32 between the pinch roller 112 and the drive capstan 72 to draw the tape through the transcribe station 56. Transcribe station 56 may be actuated at the same time as dictate station 50 so that dictation and transcription may occur at the same time.

As soon as the dictate station 50 is activated the tape 32 is drawn from the tape magazine 22 through tape opening 36 from an accumulation loop 136 of tape which may be in random-wound folds, is passed through dictate station 50 and is deposited back into the magazine through tape opening 52 to an accumulation loop 138. As long as the transcribe station 56 is not actuated tape drawn through the dictate station 50 will continue to accumulate in loop 138. As soon as the dictation begins an appropriate signal at the transcriptionist's instrument indicates to the transcriptionist that material is ready for transcribing and the transcriptionist may begin transcribing the material on tape 32. Thus, the transcribe station 56 may be actuated and draws tape accumulated in loop 138 through tape opening 54 through the transcribe station 56 and deposits the tape back in the magazine 22 through tape opening 58 to accumulation loop 136.

As long as there is sufficient tape in loop 138 to be drawn through transcribe station 56 both the dictate station 50 and the transcribe station 56 may operate at the same time. However, if dictate station 50 should be deactivated, for example when dictation ceases or if the dictate station is activated to a backspace mode, so tape loop 138 becomes taut, then there will be insufficient tape in tape loop 138 to allow transcription and dictation to occur. Thus, a tautness will be sensed in tape loop 138.

Accordingly, a tape tautness assembly 140 is provided which includes a lever member 142 pivotally mounted within magazine 22 at the upper end of the magazine 22 which includes an extending finger 144. A microswitch 146 having a microswitch actuating arm 148 extending therefrom is positioned so that when the tape loop 138 becomes taut, the tape contacts the sensing lever 142 and pivots extending finger 144 into contact with microswitch actuating arm 148. This closes the microswitch 146 to initiate an electrical signal to active solenoid 122b thereby pivoting pinch roller **112*b* into contact with drive capstans 76. Thus, both drive capstans 72 and 76 drive tape 32 in a forward direction during periods when tape tautness is sensed by microswitch assembly 140. If the tautness in loop 138 results because the dictate station has been placed in a backspace mode, i.e., where pinch roller 112*c* is against drive capstan 78, then when microswitch assembly 140 is activated solenoid 122*c* controlling pinch roller 112*c* is deactivated and solenoid 122*b*** activated to insure that the tape is driven only in the forward direction.

Tape tautness in tape accumulation loop 138 could also occur if the transcribe station 56 is driving the tape in a forward direction and dictate station 50 is activated by the dictator and placed in a backspace mode. In this occurrence solenoid **122*c* is activated withdrawing plunger 120*c* so that lever 108*c* pivots pinch roller 112*c* into contact with capstan 78. Capstan 78 drives tape 32 in the reverse direction and would draw tape from accumulation loop 138 up through tape opening 52 and back into the magazine through tape opening 48 to form a tape accumulation loop 150. If tape accumulation loop 138 becomes small enough when dictate station 50 is placed in a backspace mode and microswitch assembly 140 is activated, solenoid 122*c* will be deactivated thus disengaging the backspace tape drive in the dictate station 50** so that no further reverse movement of the tape could occur.

Accumulation loop 150 is formed only when the dictate station 50 is placed in a backspace mode and this condition occurs most commonly when the dictator backspaces the tape 32 to review a portion of material that he has dictated previously. In the event the dictator backspaces the tape to a significant extent to review a portion of the dictation and subsequently disconnects the dictate station 50, the accumulation loop 150 would remain and if the dictator subsequently activated the dictate station 50 and began dictation immediately, the newer dictated material would be recorded on the tape 32 and the old dictated material erased. To avoid this inadvertent erasure of previously dictated material a furthest advance switch assembly is provided.

The furthest advance switch assembly includes a lever 152 pivotally mounted to the chassis plate 20, as at 154, upon which is mounted an idler roller 156. A microswitch assembly 158 including a microswitch actuation arm 160 is mounted on chassis plate 20 and positioned in the path of pivotable movement of lever 152. During a normal operating mode when dictate station 50 is operating to drive the tape 32 in a forward direction, tape accumulation loop 150 is not formed and the tape follows the path shown in solid line so that lever 152 is pivoted by the tension in the tape 32 to the full line position shown in FIG. 2. Thus, microswitch actuating arm 160 is depressed to close microswitch 158.

When microswitch 158 is maintained closed an electrical response is initiated to the electrical control circuit (not shown) which controls solenoid 122b and thus the forward drive capstan 76 in dicate station 50 under certain circumstances. If the dictator backspaces the tape to form accumulation loop 150, the tape tautness is relieved and the tension holding lever 152 against solenoid actuating arm 160 is removed. Lever 152 pivots under the action of gravity to the position shown in broken line in FIG. 2 thus opening microswitch 158. When microswitch 158 is opened an electrical signal is initiated so that if the dictator disconnects his dictate instrument 12 from the system while accumulation loop 150 is formed, solenoid **122*b* is automatically actuated to drive the tape 32 in a forward direction until accumulation loop 150 no longer exists and the tape is pulled taut to pivot lever 152 and close microswitch 158. With the closing of microswitch 158 solenoid 122*b* is deactivated and the dictate station placed in a neutral ready-to-dictate position. This feature is important to preserve dictation on tape which has been backspaced and to prevent the dictator from inadvertently dictating over and erasing previously dictated material. The return feature to eliminate accumulation loop 150** is only actuated when the dictator disconnects his dictation apparatus from the system and is not actuated when the dictator wishes to dictate over or change previously dictated material.

Mounted on lever 152 is an erase head 161 which is disposed in abutting relationship against tape 32 to erase signals from the tape before the tape passes into dictate station 50. To insure that signals on tape 32 are not inadvertently erased by erase head 161, the furthest advance switch assembly is responsive to sensed tape tautness should the transcriptionist place transcribe station 56 in a back-space mode so that accumulation loop 136 becomes taut. In this event, the backspace drive in transcribe station 56 is disconnected to preclude drawing tape with dictated material thereon from accumulation loop 150 passed the erase head 161.

One additional tape tautness sensing assembly 162 is provided which includes a microswitch 164 having a microswitch actuating arm 166 positioned to be contacted by the extending finger 168 of a pivotally mounted lever 170. A tautness sensing assembly 162 senses tape tautness when accumulation loop 136, which is the loop of tape from which tape to be dictated upon is drawn, is eliminated. This condition occurs if the dictator has dictated continuously for the full length of time of the tape capability in the apparatus without transcription taking place. Thus, if the apparatus is provided with sufficient tape to permit one hour of dictation, and the dictator dictates for 1 hour without transcription occurring, tape loop 138 will be eliminated and the tape will be pulled taut pivoting extending finger 168 into contact with the microswitch actuating arm 166. When this condition occurs, solenoid 122b is deactivated precluding further forward drive of the tape through the dictate station 50.

Another advantage of the dictating and transcribing system of the present invention is afforded by the tape drive path wherein the tape is drawn from magazine 22 up over roller 38, along horizontal guide track 40 and over roller 44 to be returned to the magazine. This affords a tape path which lessens tape loop tension thus making the tape easier to drive. Accordingly, the tape drive mechanisms can be lighter and smaller than heretofore achieved.

Additionally, the tape path over the tape drive system permits ready replacement of the tape loop by a factory-spliced continuous tape loop making tape replacement by service personnel relatively simple should tape replacement be necessary. The advantage to this feature is that field spliced tape cannot be accomplished in as satisfactory a manner as a splice placed in the tape during manufacture. Thus, for ease of tape replacement movable cover plates 174, 176, 178 and 180 are provided over tape openings 36, 58, 54 and 52, respectively.

To replace a tape loop, cover plates 174–180 are removed, the tape to be replaced is removed and a new tape loop threaded through the fully exposed tape drive assembly, with the excess accumulation loops being readily inserted in magazine 22 through the tape openings.

In addition the tape path arrangement allows a great simplification in the construction of the tape storage magazine 22. Because all drive segments are above the magazine and the tape is drawn over the top of the tape drive units, the magazine need only be of a simple construction without idler rollers and tape guides within.

Also the two-motor drive system and the preferred utilization of identical parts have the advantage that varying loads in the dictate and transcribe stations do not effect each other. Thus, speed variations are mechanically isolated. Direct belting from the motor shaft to the forward play drive capstans eliminates the necessity for intermediate step-down pulley mechanisms. Additionally, the belting arrangement provides for speed control between forward and reverse play modes using only two motors rather than the four motors employed in prior art devices.

While the present invention has been described as utilizing two identical synchronous motors it is to be expressly understood that the motor for the transcribe station could be provided with speed control capability to afford the transcriptionist the ability to slow the tape speed down whenever desired, for example if a dictator spoke too rapidly.

It is thus seen that the dictating and transcribing system of the present invention provides a system which minimizes tape loop tension to enable the use of smaller and lighter tape drive assemblies. Because the tape magazine stores the tape in loose random-wound folds, very little resistance to tape movement is imparted to the tape in the tape storage magazine. Thus, the tape path above the dictate and transcribe stations minimizes tape tension significantly. Further the system includes tape tautness sensing mechanisms which disconnect the tape drive through the dictate station when a tautness in the tape is detected.

The system also provides a transcribe station tape drive override so that at all times the tape drive through the transcribe station takes precedence. This enables the transcriptionist to control the tape drive through the transcribe station even after the dictation station tape drive has been deactivated because the dictator has ceased dictation, or a tape tautness is sensed in the tape accumulation loop between the dictate station and the transcribe station.

Additionally, the system provides a furthest advance sensing mechanism to advance any tape which has been previously backspaced through the dictate station for review and which has not been advanced when the dictator ceases dictation and disconnects the dictating instrument from the system.

What we claim is:

1. A dictating and transcribing system utilizing an endless loop of magnetic tape of substantial length comprising:

a chassis plate, a dictate station including transducer means adapted to record on and playback from said magnetic tape, a transcribe station including transducer means adapted to playback from said magnetic tape, tape storage means associated with said system adapted to store accumulated loops of said magnetic tape, tape drive means associated with each of said dictate station and transcribe station adapted to selectively drive said tape through each said station in a forward and reverse direction, said tape being disposed for movement along a path of travel through said dictate and transcribe stations with provision for forming accumulated tape storage loops between each said stations in said tape storage means, a furthest advance sensing means associated with said dictate station tape drive means, said furthest advance sensing means including means to sense tape tautness in a tape accumulation loop forward in the path of tape travel in advance of said dictate station, said accumulation loop being formed when said dictate station tape drive means is actuated to draw a length of tape through said dictate station in a reverse direction thereby relieving tape tautness, said sensing means adapted to initiate said dictate station forward tape drive to drive said length of tape through said dictate station until tape tautness is sensed by said sensing means.

2. A dictating and transcribing system as defined in claim 1 wherein said tape tautness sensing means comprises a microswitch mounted to said chassis including a microswitch actuating arm and a lever pivotably mounted to said chassis adjacent said path of tape travel and pivotable from a first position when said accumulation loop is formed spaced from said microswitch actuating arm and said microswitch is open to a second position in contact with and depressing said actuating arm to close said microswitch when said tape is taut and said dictate station tape drive means being selectively actuated responsive to the open and closed condition of said microswitch.

3. A dictating and transcribing system as defined in claim 1 wherein said tape storage means comprises a tape storage magazine to store an endless loop of magnetic tape in random-wound folds including tape guide means mounted on said chassis plate, said tape guide means including a single guide means disposed above said dictate and transcribe stations to support said tape along a linear path of travel from one side of said storage magazine to the other side of said storage magazine thereby to minimize tape tension during movement of said tape along its path of travel.

4. A dictating and transcribing system as defined in claim 3 wherein said path of tape travel through said system comprises a path in a forward direction of tape movement leading out of said magazine through a first tape opening in said magazine, along said single guide means back into said tape magazine at the other side thereof through a second tape opening, out of said magazine through a third tape opening in said magazine, through said dictate station into said magazine through a fourth tape opening in said magazine, out of said magazine through a fifth tape opening, through said transcribe station into said magazine through a sixth tape opening and out of said magazine through said second tape opening whereby a first tape accumulation loop may be formed within said magazine between said second and third tape openings, a third tape accumulation loop may be formed within said magazine between said fourth and fifth tape openings and a fourth tape accumulation loop may be formed within said magazine between said fifth and sixth tape openings.

5. A dictating and transcribing system as defined in claim 4 wherein said tape drive means associated with said dictate station and said transcribe station each includes separate means to drive said tape along a forward path of movement and separate means to drive said tape in a reverse path of movement.

6. A dictating and transcribing system as defined in claim 5 wherein said drive means associated with said dictating station and said transcribing station each comprise a forward drive capstan and a reverse drive capstan rotatably mounted within said chassis plate and disposed adjacent the path of tape travel, a motor mounted on said chassis plate including an output shaft, coupling means coupling said motor output shaft to said drive capstans to rotate said capstans and selectively actuable pinch roller means associated with each said drive capstan and movable from a first position spaced from said capstan to a second position in contact with said capstan with said tape disposed therebetween whereby said rotating capstan drives said tape.

7. A dictating and transcribing system as defined in claim 6 including tape tautness sensing means disposed along said path of tape travel within said magazine between said fourth and fifth tape openings therein to sense tautness in the tape in said third tape accumulation loop, said tape tautness sensing means being responsive to sensed tape tautness in said third tape accumulation loop to preclude continued engagement of said pinch roller means associated with said dictate station reverse tape drive capstan to prevent driving said tape in a reverse direction while tape tautness is sensed and to selectively actuate said pinch roller means associated with said dictate station forward tape drive capstan to activate the forward tape drive means in said dictate station.

8. A dictating and transcribing system as defined in claim 6 including tape tautness sensing means disposed along said path of tape travel within said magazine between said first and sixth tape openings therein to sense tape tautness in said fourth tape accumulation loop to preclude continued engagement of said pinch roller means associated with said dictate station forward tape drive capstan to preclude further forward drive of tape through said dictate station while tape tautness is sensed.

* * * * *